US009818232B2

(12) United States Patent
Mittal et al.

(10) Patent No.: US 9,818,232 B2
(45) Date of Patent: Nov. 14, 2017

(54) COLOR-BASED DEPTH SMOOTHING OF SCANNED 3D MODEL TO ENHANCE GEOMETRY IN 3D PRINTING

(71) Applicant: Adobe Systems Incorporated, San Jose, CA (US)

(72) Inventors: Amit Mittal, Uttar Pradesh (IN); Harsh Vardhan Chopra, New Delhi (IN); Naveen Prakash Goel, Uttar Pradesh (IN); Mayur Hemani, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 121 days.

(21) Appl. No.: 14/836,701

(22) Filed: Aug. 26, 2015

(65) Prior Publication Data
US 2017/0061701 A1    Mar. 2, 2017

(51) Int. Cl.
*G06K 9/00*   (2006.01)
*G06T 19/20*  (2011.01)
*G06T 7/00*   (2017.01)
*G06T 5/00*   (2006.01)
*G06T 7/40*   (2017.01)

(52) U.S. Cl.
CPC ............ *G06T 19/20* (2013.01); *G06T 5/002* (2013.01); *G06T 7/0075* (2013.01); *G06T 7/0085* (2013.01); *G06T 7/408* (2013.01); *G06T 2200/08* (2013.01); *G06T 2200/12* (2013.01); *G06T 2207/10028* (2013.01); *G06T 2219/2021* (2013.01)

(58) Field of Classification Search
CPC .............. G06T 19/20; G06T 5/002; G06T 2219/2021; G06T 2200/08; G06T 2200/12; G06T 2207/10028
See application file for complete search history.

(56) References Cited

U.S. PATENT DOCUMENTS

| | | | | |
|---|---|---|---|---|
| 2004/0212725 | A1* | 10/2004 | Raskar | G06T 15/02 348/370 |
| 2010/0046837 | A1* | 2/2010 | Boughorbel | G06T 7/50 382/173 |
| 2011/0115886 | A1* | 5/2011 | Nguyen | H04N 13/025 348/47 |
| 2011/0254841 | A1* | 10/2011 | Lim | G06T 17/20 345/421 |
| 2012/0274634 | A1* | 11/2012 | Yamada | G06K 9/00362 345/419 |
| 2013/0163853 | A1* | 6/2013 | Kwak | G06T 7/0042 382/153 |
| 2013/0301908 | A1* | 11/2013 | Shim | G06T 5/005 382/154 |

(Continued)

Primary Examiner — Samir Ahmed
(74) Attorney, Agent, or Firm — Keller Jolley Preece

(57) ABSTRACT

Methods and systems for correcting depth irregularities in a three-dimensional scanned model. In particular, one or more embodiments obtain depth data and color data for an object using a depth scanner and a color scanner, respectively. One or more embodiments identify, based on edge information in the color data, regions that have no depth data that are part of the object. One or more embodiments then correct the depth frame by assigning depth data to the identified regions based on a gradient of depth data from areas near the identified regions. The methods and systems use the corrected depth data to generate a corrected three-dimensional model of the object.

20 Claims, 10 Drawing Sheets

(56) References Cited

U.S. PATENT DOCUMENTS

2014/0212031 A1* 7/2014 Tytgat .................... G06T 7/251
 382/154
2014/0226899 A1* 8/2014 Thebault ............ H04N 13/0011
 382/154

* cited by examiner

COLOR-BASED DEPTH SMOOTHING OF SCANNED 3D MODEL TO ENHANCE GEOMETRY IN 3D PRINTING

BACKGROUND

1. Technical Field

One or more embodiments relate generally to systems and methods for correcting depth data in a three-dimensional scanned image. More specifically, one or more embodiments relate to systems and methods of color-based smoothening of depth data in a three-dimensional scanned image.

2. Background and Relevant Art

Three-dimensional image scanning technology has many different uses. For example, three-dimensional image scanners (such as RGB-D cameras) can capture both color/texture data and depth data of objects. When scanning an object to generate a three-dimensional image, conventional three-dimensional scanning systems can encounter difficulties with accurately detecting depth in connection with transparent or semi-transparent materials. Specifically, transparent or semi-transparent materials can deflect or otherwise prevent infrared radiation (IR) from returning to the three-dimensional image scanner and thereby produce noise or otherwise prevent the capture of depth data. When producing a three-dimensional scanned image with regions having noisy depth data, conventional three-dimensional scanning systems often produce a three-dimensional image with "holes" or irregularities corresponding to the noisy regions. Additionally, conventional three-dimensional scanning systems can be prone to introducing sampling artifacts in the depth data.

After generating a three-dimensional scanned image with irregularities, conventional systems typically require a user to manually correct the depth irregularities. For example, a user often has to manually fill holes and correct geometry irregularities or artifacts using tools specifically designed for manipulating three-dimensional models. Tools that allow users to manually fill holes in three-dimensional models can be cumbersome, and the process of manually correcting such irregularities can be very time consuming.

These and other disadvantages may exist with respect to conventional three-dimensional scanning techniques.

SUMMARY

One or more embodiments provide benefits and/or solve one or more of the foregoing or other problems in the art with systems and methods for smoothening depth data in a three-dimensional scanned image. In particular, one or more embodiments of the systems and methods identify one or more regions of an object in a three-dimensional scan that have missing or irregular depth data. The systems and methods then correct the one or more regions by assigning depth to, or correcting depth data of, the one or more regions.

More particularly, the systems and methods can determine whether regions with missing or irregular depth data should have regular depth information. In particular, the systems and methods can convert depth information from the scan into a binary mask that indicates regions of the scan that have regular depth information and regions that lack regular depth information. The systems and methods can then compare the binary mask to the color information from the scan to identify which regions have corresponding smooth color information, and thus, should have regular depth information.

To correct the regions lacking regular depth information that should have regular depth information, the systems and methods can identify depth information of portions surrounding the regions. The systems and methods can then determine a gradient of the depth data surrounding the regions. The systems and methods can then fill in the regions with depth information by creating a smooth transition of the gradients using a surface-fitting algorithm.

Additional features and advantages of one or more embodiments of the present disclosure will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features may be obtained, a more particular description of embodiments systems and methods briefly described above will be rendered by reference to specific embodiments thereof that are illustrated in the appended drawings. It should be noted that the Figures are not drawn to scale, and that elements of similar structure or function are generally represented by like reference numerals for illustrative purposes throughout the Figures. Understanding that these drawings depict only typical embodiments and are not therefore to be considered to be limiting of its scope, the systems and methods will be described and explained with additional specificity and detail through the use of the accompanying drawings in which.

DETAILED DESCRIPTION

Figure 1:
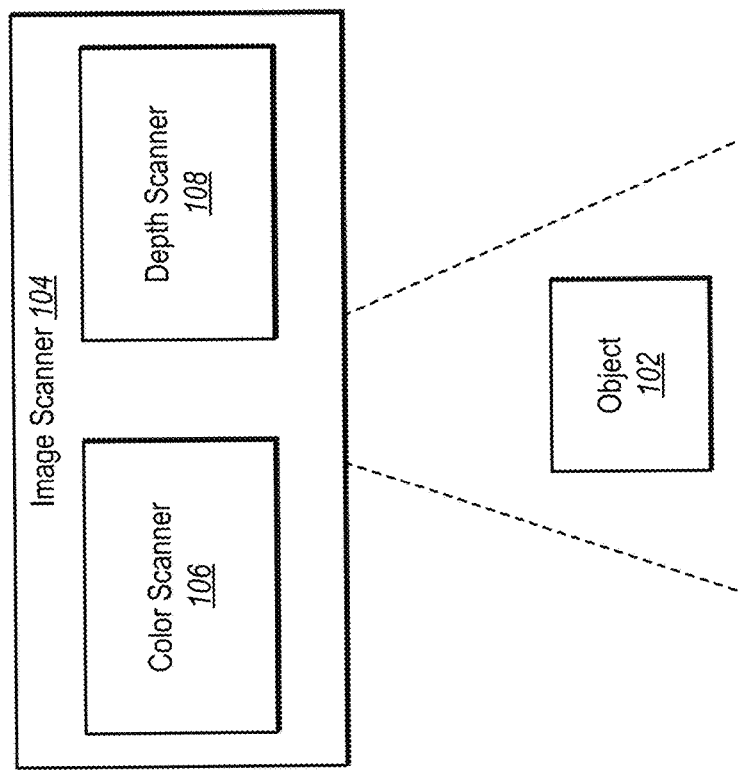
FIG. 1 illustrates an environment in which a three-dimensional image scanner can operate in accordance with one or more embodiments.

One or more embodiments of the present disclosure include a three-dimensional imaging system for scanning an object and generating a three-dimensional model. In particular, one or more embodiments of the three-dimensional imaging system correct depth irregularities in a three-dimensional scan of an object or scene. For instance, the three-dimensional imaging system scans, or otherwise obtains, depth data and color data for the scene. The three-dimensional imaging system uses edge information from the color data to identify regions in the object for which the system obtained inadequate depth data. Additionally, the three-dimensional imaging system corrects the depth data in identified regions based on the areas surrounding the corresponding regions. By automatically detecting and correcting depth issues in the depth data, the three-dimensional imaging system can generate a model for the object without requiring manual correction of the depth irregularities.

In one or more embodiments, the three-dimensional imaging system determines that portions of a captured data image that have no depth data. Specifically, the one or more regions may have no depth data due to object boundaries or materials in the scene. For example, object boundaries and certain materials can produce noise in depth data that causes the three-dimensional imaging system to have a low confidence in the depth data. Thus, an initial captured depth frame can lack depth data in one or more regions that should have depth data.

According to one or more embodiments, the three-dimensional imaging system identifies whether regions lacking depth data are part of a specific object in the scene. For example, a depth frame can include depth irregularities in varying locations within a scene due to different materials or depth differences at object boundaries. In at least some implementations, the three-dimensional imaging system attempts to determine the depth for one specific object in the scene. Depth irregularities that fall outside the object may not matter when generating the scanned model of the object.

To determine whether a given region is within a specific object, the three-dimensional imaging system identifies a position of the region relative to one or more boundaries of the object. In particular, the three-dimensional system uses color data from a color frame of the scene to determine whether regions with depth irregularities occur within the specific object. For example, the color frame includes edge information that allows the three-dimensional imaging system to determine whether the regions without depth data are part of the object or part of the background of the object. Thus, the three-dimensional imaging system identifies one or more regions to correct to generate a three-dimensional scanned model without depth irregularities.

Additionally, after identifying regions for correcting the depth irregularities, the three-dimensional imaging system corrects the depth irregularities by using depth data from nearby areas. For example, the three-dimensional imaging system uses depth data for an area surrounding an identified region with no depth data to smoothen the identified region. Specifically, the three-dimensional imaging system uses a surface-fitting algorithm that smoothens the identified region in accordance with the gradient of the surface in the surrounding area. Modifying the depth data for identified regions based on corresponding nearby areas allows the three-dimensional imaging system to fill in the identified regions with depth data that approximates the actual depth for those regions.

As used herein, the term "depth data" refers to data that describes a depth of one or more objects in an image. For example, depth data describes a three-dimensional aspect of pixels in a three-dimensional image. To illustrate, assigning depth data to each pixel in an image can allow a system or user to understand depth relationships between objects in an image. Depth data can be useful in generating three-dimensional models of objects or scenes for use in providing a three-dimensional display to a user, printing three-dimensional objects on a three-dimensional printer, or for interpreting spatial relationships between objects in performing other computational tasks. Additionally, as used herein, the term "depth frame" refers to an image that the three-dimensional imaging system generates using depth data for the one or more objects in the image. For example, a depth frame can include a depth map that maps depth values to each pixel in the image.

As used herein, the term "color data" refers to data that describes color values of pixels in an image. For example, color data can include RGB values (or values corresponding to another color model) for each pixel in an image, including visible texture information. The three-dimensional imaging system can capture a color frame that includes color data of a scene. The color data can be useful in comparing the depth data of pixels in a depth frame to the corresponding color data of the same pixels in the color frame for determining where edges or boundaries of objects are located within the captured scene. As used herein, "edge information" refers to edges or boundaries of objects in an image based on an analysis of the color data.

Also as used herein, "color frame" refers to an image that the three-dimensional imaging system generates using color data for the image. For example, a color frame can include a two-dimensional image with the color values of each pixel in the image.

As mentioned, the three-dimensional imaging system generates a three-dimensional ("3D") scanned model or 3D image of a scene including one or more objects. FIG. 1 illustrates an embodiment of an environment in which a 3D imaging system 100 ("imaging system") scans an object 102 and creates a 3D model or mesh of the object 102. Specifically, the imaging system 100 captures a depth frame and a color frame for the object 102 and combines the depth frame and the color frame to create the 3D model.

In one or more embodiments, the imaging system 100 can include one or more image capturing devices. In particular, the imaging system 100 can include an image scanner 104 with separate devices for capturing color frames and depth frames. For example, FIG. 1 illustrates that the imaging system 100 includes a color camera 106. The color camera 106 captures color data of the object 102 and stores the color data in a color frame. To illustrate, the color camera 106 can include a high-definition camera device capable of generating color frames with high pixel density, though the color camera 106 can include one or more different types of color frame capturing devices as may serve a particular embodiment.

Additionally, the imaging system 100 of FIG. 1 also includes a depth camera 108. The depth camera 108 captures depth data of the object 102 and stores the depth data in a depth frame or depth map. To illustrate, the depth camera 108 can include a camera device that is capable of detecting how close objects are to a reference point (e.g., the depth camera 108) and translate the captured image into depth data that describes the depth of each pixel relative to the reference point. For instance, the depth camera 108 can use one or more infrared or near-infrared sensors that detect the depth of an object based on energy that reflects or bounces off of the objects. One or more other embodiments may include depth scanners that use other types of depth sensing technologies, as may serve a particular embodiment.

In one or more embodiments, the imaging system 100 can use separately packaged devices for capturing color data and depth data. For instance, the imaging system 100 can use separately packaged color camera(s) 106 and depth camera (s) 108. Alternatively, the imaging system 100 can use a color camera 106 and a depth camera 108 that are included in a single imaging device. In one or more additional embodiments, the imaging system 100 can use third-party imaging device(s) for capturing the color data and the depth data, and apply post-imaging processing to the color data and the depth data to correct depth irregularities, as described in more detail below.

As mentioned previously, the imaging system 100 can capture images of a scene that includes one or more objects. Additionally, the one or more objects can include any type of objects, which may include different shapes, layers, and/or materials. Some materials reflect light or radiation better than other materials, resulting in some regions of an object producing less noise than others. For example, transparent or semi-transparent materials (e.g., glass, some plastics, some fabrics/clothing, netting) may not reflect light or radiation accurately to the depth camera 108, resulting in a large amount of noise. Due to high amounts of noise in some regions, the imaging system 100 can assign a low confidence to the regions and produce a depth frame that has no depth data or noisy depth data for the regions with low confidence.

Figure 2:
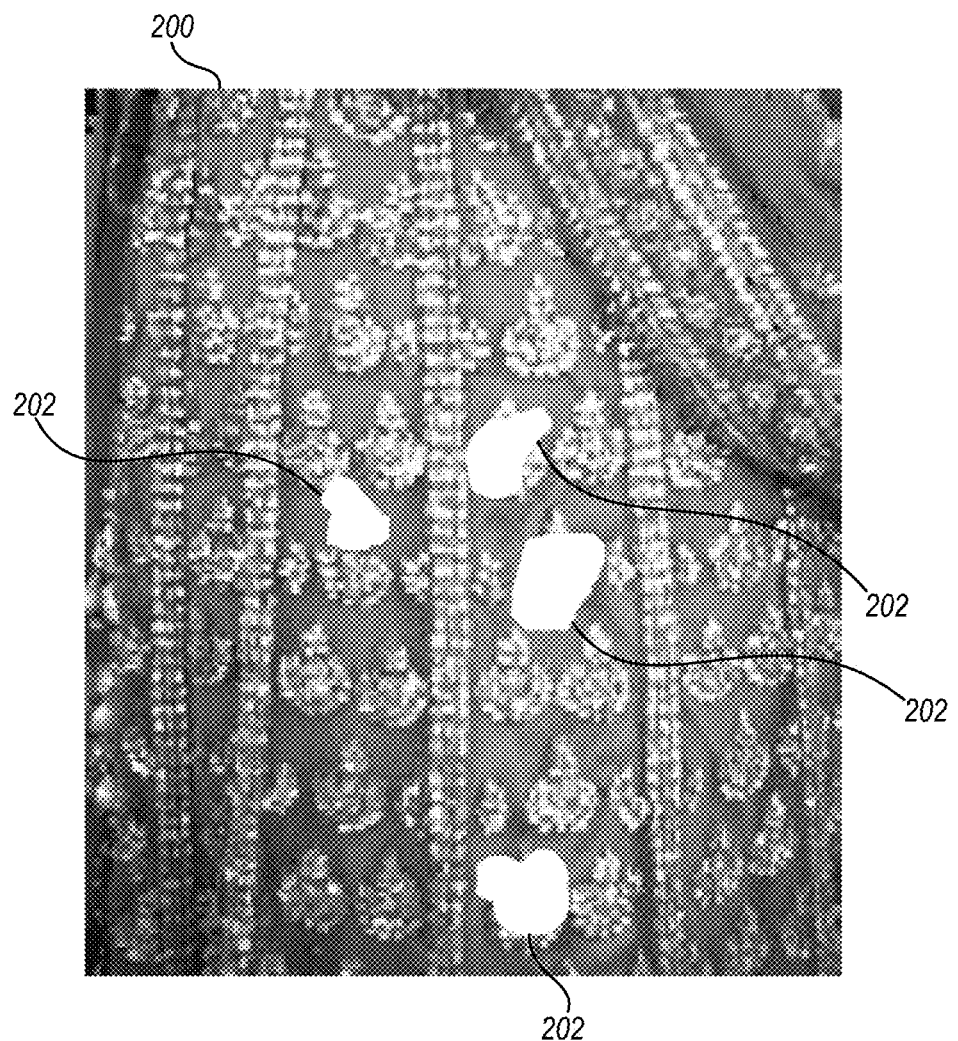
FIG. 2 illustrates an image including a three-dimensional scanned model of an object in accordance with one or more embodiments.

FIG. 2 illustrates an embodiment of an image of an uncorrected 3D scanned model ("model") for an object prior to correcting the depth issues. Specifically, the image includes a model of a portion of an object (i.e., a model human figurine wearing clothing with at least some semi-transparent material) that results from combining raw depth data and color data from the depth camera 108 and the color camera 106. Although the image illustrates only a zoomed-in portion of the object, the image may be part of a larger image that includes the entire figurine. The image may also be part of a larger image that includes a background or other objects that are not part of the figurine or the clothing.

As shown, FIG. 2 illustrates a 3D model 200 that a conventional image scanner creates by combining a color frame and a depth frame of the object. A conventional image scanner can obtain the color frame with the color scanner and the depth frame with a depth scanner. A conventional image scanner can then combine the color frame and the depth frame into the model 200 such that the model 200 includes both color data and depth data for the object.

The model 200 of FIG. 2 includes originally captured depth data for the object. Thus, the model 200 can include depth irregularities corresponding to portions of the object for which scanner was unable to obtain depth data with a high confidence level. For example, as illustrated, the object includes a semi-transparent material. The scanner may not be able to obtain accurate depth data for one or more regions of the object due to the semi-transparent material. Specifically, the semi-transparent material in some regions of the clothing may prevent radiation from reflecting to the image scanner, which introduces noise (e.g., reduces a signal-to-noise ratio) into the depth data and produces a low confidence level for those regions.

In one or more embodiments, regions having no depth data or depth data with a signal-to-noise ratio below a threshold level can cause sampling artifacts, such as aliasing or surface errors, in the model 200. For example, depth irregularities can appear as holes within the model 200. In one or more implementations, the holes can be visible to a user viewing the model 200. To illustrate, the white regions (modified for ease of visibility) in the image of FIG. 2 correspond to regions 202 of the object that have no depth data and are easily identifiable to the naked eye. In other instances, depth irregularities may not be as easily identifiable to the naked eye, but may still be present and/or may cause problems with performing one or more computer processes using the model 200 without first correcting the depth issues.

Referring to the image system 100 of FIG. 1, after the imaging system 100 collects the depth data and the color data from the object for use in generating a 3D model, the imaging system 100 can use the color data in correcting errors or irregularities in the depth data. In one or more embodiments, the imaging system 100 can obtain the raw data from the depth camera 108 and the color camera 106 for processing to remove depth irregularities. For example, the imaging system 100 can interface with the depth camera 108 and the color camera 106 to process the data while the imaging system 100 scans the object to correct the depth irregularities. Alternatively, the imaging system 100 can obtain data from the depth camera 108 and color camera 106 to process the data after the depth camera 108 and the color camera 106 have completed scanning the object.

As described in more detail below, the imaging system 100 can obtain more accurate depth information to generate a smooth three-dimensional mesh than conventional image scanners. Additionally, the imaging system 100 can eliminate the need for a user to manually post process irregular geometries or holes in the three-dimensional mesh. Manual correction of the irregularities can be cumbersome for high-density meshes. Additionally, the imaging system 100 can distinguish between regions of an object with high depth variations, such as the convex hull of clothing or a body of a figure and interior regions where depth variation smoothly varies. The imaging system 100 can also smoothen depth data by removing aliasing and reducing noise using a gradient analysis over the surface of the object.

Figure 3:
FIG. 3 illustrates a color frame for the object of FIG. 2 in accordance with one or more embodiments.

When processing the depth data to remove the irregularities, the imaging system 100 uses color data from the color camera 106. Specifically, the color camera 106 generates a color frame that includes color data of the scanned object. For example, FIG. 3 illustrates a color frame 300 that the color camera 106 captured from the object 102 of FIG. 1. In particular, the color frame 300 can include color data for a plurality of pixels in a two-dimensional image of the object 102. To illustrate, the color frame 300 can include a plurality of RGB values for the plurality of pixels in the two-dimensional image of the object 102. Alternatively, the color frame 300 can include another set of color values corresponding to another color model (e.g., the HSV color model).

As illustrated, the color frame 300 can include color data for identifying different objects within the scene. In particular, the color data can allow the imaging system 100 to identify boundaries of objects, edges, textures, and other information that is typically identifiable in a two-dimensional color image of a scene. As described below, the imaging system 100 can use the color data to identify edges and boundaries of objects for use in determining whether a region with no depth data is part of an object. Determining whether a region without depth data is part of the object can be useful in determining whether to correct depth irregularities for the region.

Figure 4:
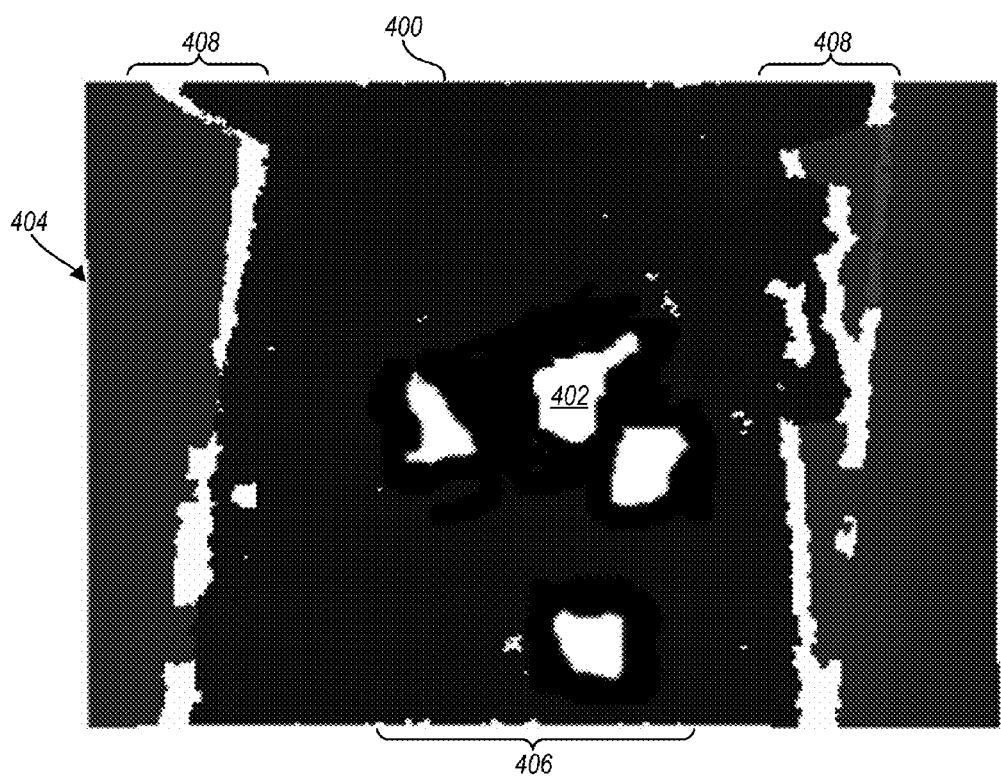
FIG. 4 illustrates a binary mask of a depth frame for the object of FIG. 2 in accordance with one or more embodiments.

FIG. 4 illustrates an example binary mask 400 of a depth frame for the object of FIG. 2. In particular, after obtaining the depth data from the depth camera 108 for the depth frame, the imaging system 100 can generate a binary mask 400 that includes binary representations of depth data for the depth frame. For example, the binary mask 400 can allow the imaging system 100 to identify regions of the depth frame that have incorrect or inaccurate depth data. To illustrate, the imaging system 100 can identify regions of the depth frame that include a significant amount of noise.

According to one or more embodiments, for regions 402 with a large amount of noise and low confidence level, the imaging system 100 can assign a binary value (e.g., "0" for no depth information) represented by the white portions of the depth frame in FIG. 4. The imaging system 100 can also assign a binary value (e.g., "1" for correct depth information) to regions 404 with low noise and a high confidence value to indicate that the regions have accurate depth data. Thus, the binary mask 400 illustrates a binary representation of each region 402 for which the imaging system 100 may have noisy, missing, or irregular depth data.

In one or more embodiments, the imaging system 100 can identify whether to assign a "0" or a "1" to areas in the depth frame using an algorithm that analyzes the depth data to identify regions 402 with no depth data due to noise. To illustrate, the imaging system 100 can use a depth-first search algorithm to search for connected components (e.g., connected pixels) that have no depth data. Alternatively, the imaging system 100 can use another algorithm for finding connected components, such as a breadth-first search algorithm, as may serve a particular embodiment. The imaging system 100 can determine that a region 402 includes all connected pixels with no depth data. Thus, different groups of connected pixels with no depth data can form separate regions within the binary mask 400 of the depth frame.

As mentioned, the depth frame can include noisy regions due to semi-transparent materials corresponding to the object. Because the imaging system 100 can capture information about other objects or a background in a scene with the object, however, one or more of the regions with noisy, missing, or irregular depth data can be located in another object or in the background. Additionally, the one or more regions may also include noisy, missing, or irregular depth data at boundaries of the object. Noisy regions at boundaries of the object can cover portions of the object as well as portions of the background or other objects. The imaging system 100 may determine that not all of the regions with noisy, missing, or irregular depth data are candidates for depth correction, for example, in embodiments in which the imaging system 100 only uses the depth data for a single object.

In one or more embodiments, the imaging system 100 can identify candidate regions for depth correction by determining whether each region is part of the scanned object. Specifically, the imaging system 100 can determine whether each region is within an outer boundary (i.e., a convex hull) of the object. For example, the imaging system 100 can separate the identified regions with no depth data into different categories based on a position of the regions relative to the object and the boundaries of the object. To illustrate, the imaging system 100 can categorize, into a first category of regions 406, regions that are inside the outer boundary as candidate regions for correcting depth irregularities. Additionally, the imaging system 100 can categorize, into a second category of regions 408, regions that are on the outer boundary of the object as regions that have noise due to the large differences in depth between the background and the edges of the object.

According to at least some embodiments, categorizing the regions into the different categories can first include identifying an outer boundary of the object. In particular, the imaging system 100 can identify the outer boundary of the object by removing background from the depth data. The background typically has uniformly large values of depth (i.e., that the background is noticeably farther away from the depth camera 108 than the object). For example, the imaging system 100 can determine that a portion of the depth frame is part of the background by calculating differences in depth between different areas of the depth frame, or based on a threshold depth. If the depth data for a particular area is greater than the threshold depth, the imaging system 100 can determine that the area is part of the background; otherwise, the imaging system 100 can determine that the area is part of the object.

Once the imaging system 100 has identified the background, the imaging system 100 can remove the background by performing a flood fill operation that removes the depth data for the background. By performing a flood fill on the identified background regions, the imaging system 100 leaves only the depth data for the object and noisy areas on the outer boundary of the object that the imaging system 100 did not determine to be part of the background. Performing the flood fill operation for the background depth data can also remove regions with no depth data that are outside of the boundary from the depth frame.

After removing the background from the depth frame, the imaging system 100 can then identify whether regions within the outer boundary of the object are part of the object or part of the background. Specifically, the imaging system 100 can use color data from the color frame 300 illustrated in FIG. 3 to identify whether a specific region is part of the object or part of the background. For example, the imaging system 100 can use edge information from the color data of the color frame 300 to determine that a specific region is part of the object. To illustrate, the imaging system 100 can attempt to identify regions that are inside the outer boundary of the object, but which may not actually be part of the object.

In one or more embodiments, the imaging system 100 can determine whether the object has other boundaries within the outer boundary. Object boundaries within the outer boundary can also cause depth irregularities in the depth frame. For instance, holes in an object or spaces between portions of the object that cause the depth frame to capture depth data for the background in the regions that have noisy depth data and are not part of the object. To illustrate, if the object is a human figurine with crossed legs or arms at his/her side, the spaces between the arms/legs and the rest of the human figurine are not part of the object, but may be within the outer boundary.

The imaging system 100 can use color data from the color frame to determine whether one or more regions without depth data are actually part of the background or part of the object. In particular, the imaging system 100 can detect edge information from in the color frame that can aid in determining whether a particular region of the depth frame is part of the object. For example, the imaging system 100 can apply an edge detection filter or algorithm to the color frame to identify edges of the object. To illustrate, the imaging system 100 can use a Sobel filter to identify edges of the object from the color data (e.g., from the RGB values) of each pixel in the color frame. Alternatively, the imaging system 100 may use another type of edge detection algorithm capable of finding the edges of the object that will allow the imaging system 100 to distinguish between the object and the background, as may serve a particular embodiment.

For each identified region remaining in the depth frame after performing a flood fill operation to remove the background depth data, the imaging system 100 can compute whether the detected edges from the color frame correspond to the region. In particular, the imaging system 100 can use edge information at a location in the color frame that corresponds to the identified region in the depth frame. For example, the imaging system 100 can use pixel location information or other method of analyzing the spatial location of the region in the depth frame to identify the same location in the color frame. To illustrate, the imaging system 100 can identify, for each depth value in a region in the depth frame, a corresponding pixel in the color frame. After identifying the corresponding location in the color frame for an identified region, the imaging system 100 can determine whether edge information from the color frame corresponds to the identified region in a way that indicates that the identified region is part of the background.

In one or more embodiments, the imaging system 100 can determine whether edge information corresponds to an identified region by detecting whether a detected edge is similar in shape to the identified region. Specifically, the imaging system 100 can use an algorithm that compares the edge to a boundary of the region to determine whether the detected edge approximately matches the identified region. For example, the imaging system 100 can use an algorithm with an epsilon parameter for determining that the edge runs parallel to the boundary of the identified region. If the imaging system 100 determines that the edge runs parallel to the boundary of the identified region, the imaging system 100 can categorize the identified region in the second category of regions 408 (i.e., as part of the background). If the imaging system 100 determines that the edge does not run parallel to the boundary of the identified region, the imaging system 100 can categorize the identified region in the first category of regions 406 (i.e., as part of the object).

In various embodiments, the detected edges in a location of the color frame corresponding to the location of the identified region in the depth frame may not exactly match the boundary of the identified region. For example, either or both of the edge detection algorithm or the algorithm for generating the binary mask 400 of the depth frame may produce inexact results. Additionally, or alternatively, noise produced by the depth camera 108 may include edges that are similar to, but not exactly the same as, the detected edges for the same location in the color frame. Thus, the imaging system 100 can allow for a range of error when determining whether an edge matches or runs parallel to a boundary of a particular region. To illustrate, the imaging system 100 can adjust a tolerance of the algorithm that compares the edge to the boundary of the region based on the acceptable range of error.

Additionally, in one or more embodiments, the imaging system 100 can select one or more edges from a plurality of edges in the color frame for use in comparing to boundaries of regions without depth data. Specifically, some of the edges in the color frame may not correspond to a boundary of the object, but rather may be less prominent edges indicating visible lines associated with patterns on the object (e.g., patterns on clothing, overlapping materials on the object). The imaging system 100 can detect the most prominent or sharp edges that likely correspond to boundaries of the object for comparing to the boundaries of regions without depth data while ignoring or filtering out the non-prominent edges.

After categorizing the regions into the first category and/or the second category, the imaging system 100 can process the regions from the first category. Specifically, the imaging system 100 can process the regions from the first category that the imaging system 100 has determined are part of the object to correct the depth irregularities associated with the regions. For example, the imaging system 100 can smoothen the depth data for the regions to fit the areas around the regions. In one or more additional embodiments, the imaging system 100 can leave the depth data for the regions from the second category unchanged (i.e., the imaging system 100 can ignore the regions from the second category).

To smoothen or correct the depth data for regions marked as having no depth data in the binary mask 400 (although the regions may actually have very large depth data values that are incorrect), the imaging system 100 can identify areas in the object near the regions or surrounding the regions. In particular, the imaging system 100 can use the depth data of the nearby areas of the object from the depth frame to fit the depth data of the regions to the nearby areas. For example, for a particular region without depth data, the imaging system 100 can determine a gradient of the depth data of the area near or surrounding the particular region. To illustrate, if the particular region corresponds to a waist area of a human figurine, the imaging system 100 can determine the gradient of the waist area within a certain distance around the particular region.

The imaging system 100 can then fit the depth data of the particular region in the depth frame to the gradient of the area near or surrounding the particular region. In one or more embodiments, the imaging system 100 can use the gradient to modify the depth data of the particular region in accordance with the gradient. For example, the imaging system 100 can apply a surface-fitting algorithm to assign depth data to each pixel in the particular region based on the determined gradient of the area around the particular region.

Prior to using a surface-fitting algorithm on each pixel of the particular region, the imaging system 100 can determine how the gradient of the surrounding area corresponds to each pixel of the particular region. To illustrate, one example of a function for finding the gradient (rate of change of the depth) of the pixels in the particular region in accordance with the gradient of the surrounding area includes:

$$\frac{\partial f}{\partial x} = \frac{f(x+\epsilon) - f(x-\epsilon)}{2\epsilon}$$

$$\frac{\partial f}{\partial y} = \frac{f(y+\epsilon) - f(y-\epsilon)}{2\epsilon}$$

$$\frac{\partial f}{\partial z} = \frac{f(z+\epsilon) - f(z-\epsilon)}{2\epsilon}$$

where (x,y,z) represent the coordinates of a pixel within the region, and $\epsilon$ represents a distance of the pixel from the boundary of the region.

After obtaining the derivatives defining the gradient of the particular region in accordance with the gradient at the boundaries of the particular region, the imaging system 100 can then assign depth data to the pixels in the particular region. For example, the imaging system 100 can use a surface-fitting algorithm to assign depth values to each pixel based on the determined gradient for the pixels in the particular region. The surface-fitting algorithm can modify the depth data to correct a resulting 3D image or mesh for the object by smoothening the depth data in the regions with depth irregularities. Smoothening the depth data for the regions can approximate the depth of the actual object to produce a smooth surface in the regions that fits the areas around the regions, rather than keeping the sharp edges or points that exist in the originally captured depth frame. To illustrate, the imaging system 100 can use a surface-fitting algorithm such as a marching cubes algorithm or a marching tetrahedral algorithm to render the surfaces of the regions having no depth data or incorrect depth data in the depth frame.

Figure 5:
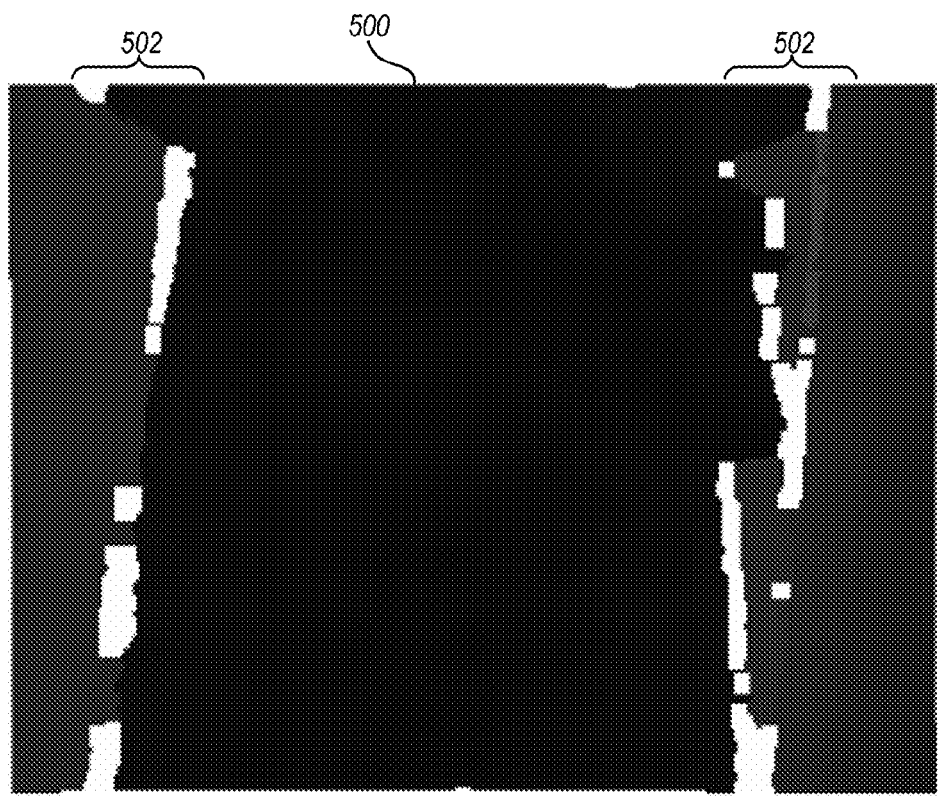
FIG. 5 illustrates a smoothened depth frame in accordance with one or more embodiments.

Applying the surface-fitting algorithm to the depth frame can produce a smoothened depth frame without depth irregularities due to semi-transparent or transparent materials. FIG. 5 illustrates an embodiment of a binary mask 500 with smoothened depth data. Specifically, the binary mask 500 of FIG. 5 corresponds to the depth frame after the imaging system 100 has removed regions with depth irregularities inside the object. As illustrated, the binary mask 500 no longer includes the regions inside the object that do not correspond to boundaries of the object. The binary mask 500 of FIG. 5 stills contain regions 502 corresponding to noisy depth data at the boundaries of the object because the imaging system 100 ignored such regions 502 when modifying the depth data of the regions inside the object.

According to at least some embodiments, the imaging system 100 can also modify the depth data for individual pixels with incorrect depth data or small groups of pixels with incorrect depth data. In one or more implementations, the imaging system 100 can use the same process for individual pixels or smaller groups of pixels as with larger regions. Alternatively, the imaging system 100 can assume that individual pixels or very small groups of connected pixels that have noisy depth data do not fall into the second category and should be corrected. For example, the imaging system 100 can correct the depth data for individual pixels or small groups of pixels without worrying about matching the pixels to edges in the color frame.

In additional, or alternative, embodiments, the imaging system 100 can apply the surface-fitting algorithm to edges of regions that fall into the second category of regions to smoothen the edges of a region without smoothening the entire region. In particular, the imaging system 100 can determine that a region that has noisy depth data at the outer boundary of the object has an excessive amount of noise (e.g., that exceeds a threshold). The imaging system 100 can smoothen the outer edges of the region (e.g., a certain number of pixels at the outer edges of the region) to ensure smooth, consistent depth data for the edges of the region without modifying the depth data of the entire region.

Figure 6:
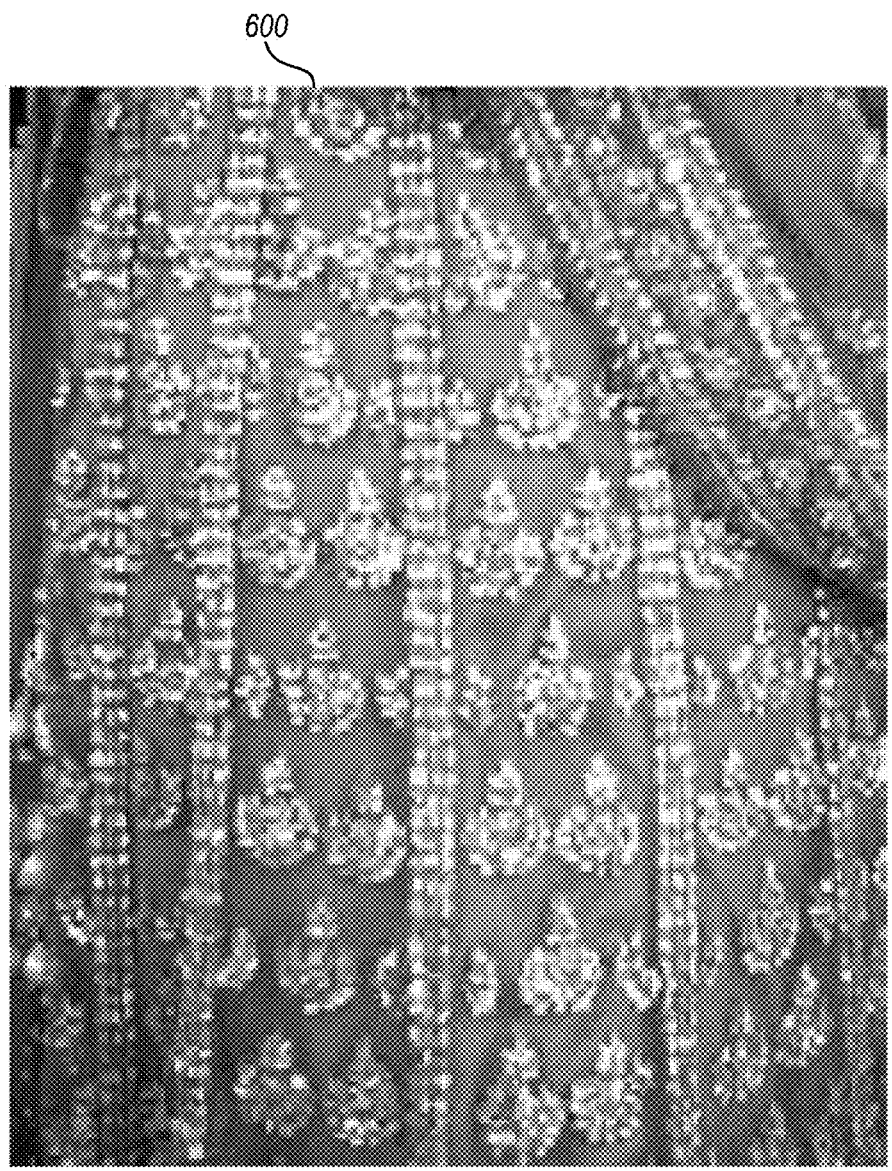
FIG. 6 illustrates an image including a corrected three-dimensional scanned model of the object of FIG. 2 in accordance with one or more embodiments.

Once the imaging system 100 has generated the smoothened depth frame by smoothening regions inside the object that had depth irregularities, the imaging system 100 can generate a corrected 3D model. FIG. 6 illustrates an image of an embodiment of the corrected 3D model 600 based on the color frame of FIG. 3 and the corrected depth frame corresponding to the binary mask 500 of FIG. 5. Specifically, the imaging system 100 combines the originally captured color frame with the corrected depth frame to generate the 3D model 600. Thus, the 3D model 600 can include the color data from the color frame and the corrected depth data from the corrected depth frame. As illustrated, the corrected 3D model 600 does not have the same holes as in the uncorrected 3D model 200 of FIG. 2.

In one or more embodiments, although the description above refers to correcting depth irregularities in a single object of the depth frame, the imaging system 100 can perform the above process for correcting depth irregularities in any number of objects within the depth frame. For example, the imaging system 100 can identify a plurality of objects (e.g., a plurality of human figurines in a scene), detect the outer boundaries of each object, and identify regions within each object that have incorrect depth data. The imaging system 100 can then process the regions for each object in accordance with the depth data for the corresponding objects. In at least some implementations, the imaging system 100 can process the depth data for each object one at a time. In alternative embodiments, the imaging system 100 can process the depth data for a plurality of objects simultaneously (e.g., using more than one processor or a processor capable of multithreading).

Figure 7:
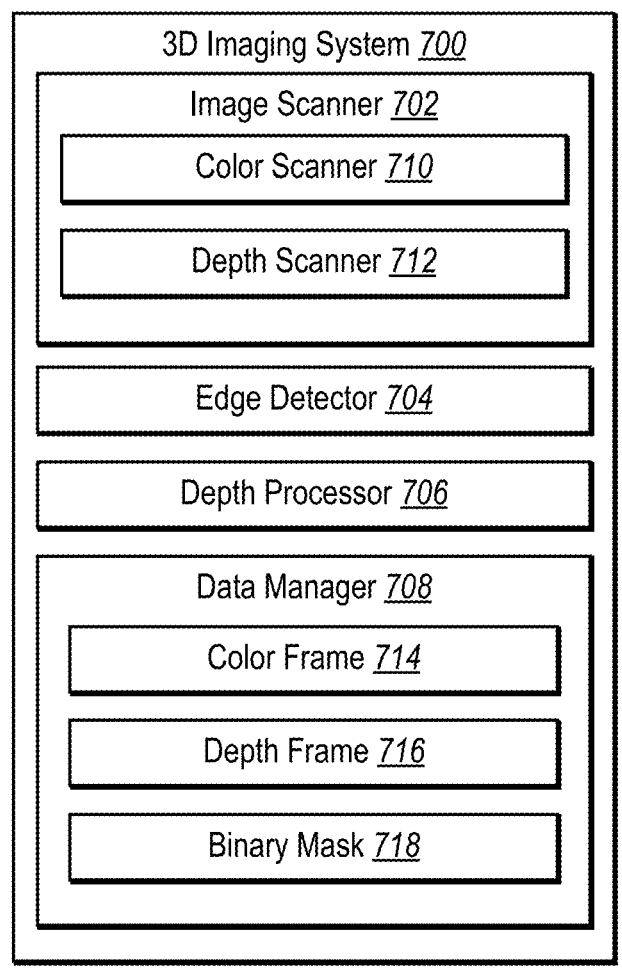
FIG. 7 illustrates a three-dimensional imaging system in accordance with one or more embodiments.

As previously mentioned, the imaging system 100 can automatically correct depth irregularities in a 3D scanned model without requiring a user to manually correct the irregularities. FIG. 7 illustrates a schematic diagram of one embodiment of an imaging system 700. As previously described, the system can include, but is not limited to, an image scanner 702, an edge detector 704, a depth processor 706, and a data manager 708. Although the imaging system 700 of FIG. 2 is depicted as having various components, the imaging system 700 may have any number of additional or alternative components. For example, the image scanner 702 can be included in a separate physical device than the edge detector 704, depth processor 706, and the data manager 708. For example, the image scanner 702 can include an individually packaged 3D camera (e.g., an RGB-D camera), and the edge detector 704, depth processor 706, and data manager 708 can be included in a computing device in communication with the image scanner 702. The 3D camera and the computing device may include separate processing units or may share the same processing units.

In one or more embodiments, each of the components and subcomponents of the imaging system 700 can be in communication with one another using any suitable communication technologies. It will be recognized that although the subcomponents of the imaging are shown to be separate in FIG. 2, any of the subcomponents may be combined into fewer components, such as into a single component, or divided into more components as may serve a particular implementation. Furthermore, although the components of FIG. 7 are described in connection with the imaging system 700, at least some of the components for performing operations in conjunction with the imaging system 700 described herein may be implemented on other devices.

The components of the imaging system 700 can include software, hardware, or both. For example, the components of the imaging system 700 can include one or more instructions stored on a computer-readable storage medium and executable by processors of one or more computing devices (e.g., the image scanner 702, the edge detector 704, the depth processor 706, or the data manager 708, or devices in communication with the components). When executed by the one or more processors, the computer-executable instructions of the imaging system 700 can cause the computing device(s) to perform the depth correction processes described herein. Alternatively, the components of the imaging system 700 can comprise hardware, such as a special purpose processing device to perform a certain function or group of functions. Additionally or alternatively, the components of the imaging system 700 can comprise a combination of computer-executable instructions and hardware.

Furthermore, the components of the imaging system 700 performing the functions described herein with respect to the imaging system 700 may, for example, be implemented as part of a stand-alone application, as a module of an application, as a plug-in for applications including image processing applications, as a library function or functions that may be called by other applications, and/or as a cloud-computing model. Thus, the components of the imaging system 700 may be implemented as part of a stand-alone application on a personal computing device or a mobile device. Alternatively or additionally, the components of the imaging system 700 may be implemented in any application that allows delivery of content to users, including, but not limited to, applications in ADOBE CREATIVE CLOUD, such as ADOBE PHOTOSHOP. "ADOBE", "CREATIVE CLOUD", and "PHOTOSHOP" are registered trademarks of Adobe Systems Incorporated in the United States and/or other countries.

As previously described, the imaging system 700 can include an image scanner 702. Specifically, the image scanner 702 can capture color data and depth data for a scene that includes one or more objects. For example, the image scanner 702 can include a color scanner 710 to capture the color data for the scene and generate a color frame that includes the color data for a plurality of pixels representing the scene. To illustrate, the image scanner 702 can generate a two-dimensional color frame with RGB values for a plurality of pixels, as described above in relation to FIG. 3. In one or more embodiments, the color scanner 710 can include a high-definition camera capable of capturing color data and assigning color values to a plurality of pixels representing the scene.

The image scanner 702 can also include a depth scanner 712 to capture depth data for the scene. The depth scanner 712 can generate a depth frame including the depth data for the scene. The depth frame can include a plurality of depth values for pixels that correspond to locations of pixels in the color frame. For example, for each pixel in the color frame, the depth frame can include a pixel at the same relative location. Thus, the depth frame and the color frame can include the same number of pixels, with each pixel in the color frame corresponding to a pixel in the depth frame.

In at least some embodiments, the depth scanner 712 and the color scanner 710 can have slightly different positions (e.g., due to capturing the scene from slightly different angles), resulting in color data and depth data in one or more locations that do not exactly match. The image scanner 702 can include one or more processors for analyzing and processing the captured color data and depth data to adjust the data for the different capture angles. Thus, the image scanner 702 can produce color data and depth data that at least closely approximate the same location in the captured scene.

In one or more embodiments, the imaging system 700 can include an edge detector 704 to facilitate detection of edges in the color frame from the color scanner 710. Specifically, the edge detector 704 can detect edges associated with the color data for use in determining whether the imaging system 700 should modify depth data for a particular region with depth irregularities. For example, as previously described, the edge detector 704 can detect whether the color frame includes edges that are indicative of a hole within an object's outer boundaries that corresponds to a region with depth irregularities. The edge detector 704 can use an edge detection algorithm such as a Sobel filter or other algorithm, as may serve a particular embodiment.

According to one or more embodiments, the imaging system 700 can also include a depth processor 706 for processing depth data received from the depth scanner 712. In particular, the depth processor 706 can identify background regions in the depth frame. For example, the depth processor 706 can determine that areas of the depth frame that have very high depth values compared to other areas are part of the background, and that the remaining areas are part of the object. Based on the identified background depth data, the depth processor 706 can also identify an outer boundary of an object in the depth frame. The depth processor 706 can remove the background depth data from the depth frame.

The depth processor 706 can also analyze the depth data in the depth frame to generate a binary mask with binary values representing the depth data. For example, as described previously in relation to FIG. 4, the depth processor 706 can determine whether a region (i.e., a group of connected pixels) has noisy depth data and assign the region a value accordingly. To illustrate, if the region has noisy depth data that exceeds a noise threshold, the depth processor 706 can assign a certain binary value to the region indicating that the region has irregular depth data. If the region does not have depth data that exceeds the noise threshold, the depth processor 706 can assign a different binary value to the region indicating that the region does not have irregular depth data.

The depth processor 706 can also use information from the edge detector 704 to identify regions in the depth frame as candidates for modifying depth data. For instance, the depth processor 706 can compare detected edges in edge information from the edge detector 704 to regions in the depth frame that have depth irregularities. The depth processor 706 can determine whether to correct the depth data for a region based on whether the region corresponds to edge information from the edge detector 704.

In one or more additional embodiments, the depth processor 706 can make modifications to the depth data in one or more regions of the depth frame. Specifically, the depth processor 706 can smoothen depth data in one or more regions that the imaging system 700 has determined has irregular depth data and are part of the object. To illustrate, the depth processor 706 can modify the depth data for the identified regions based on the gradient of the corresponding depth data surrounding the regions. For example, as previously mentioned, the depth processor 706 can apply a surface-fitting algorithm to a region to fit the surface of the region to the gradient of the surrounding area.

The imaging system 700 can also include a data manager 708 to manage data that the other components in the imaging system 700 use and/or produce. Specifically, the data manager 708 can communicate with the other components in the imaging system 700 (i.e., the image scanner 702, the edge detector 704, and the depth processor 706) to obtain data that the components have produced for storage and/or use by one or more of the components. To illustrate, the data manager 708 can store data that includes, but is not limited to, a color frame 714, a depth frame 716, and a binary mask 718 of the depth frame 716.

In one or more embodiments, the data manager 708 can communicate with the image scanner 702 to obtain the color frame 714 from the color scanner 710 and the depth frame 716 from the depth scanner 712. The data manager 708 can also communicate with the edge detector 704 to provide the color frame 714 to the edge detector 704. The data manager 708 can also communicate with the depth processor 706 to provide the depth frame 716 to the depth processor 706, and also to receive the binary mask 718 of the depth frame 716 from the depth processor 706. The data manager 708 can store any or all of the information generated by the various components for use by any of the other components.

FIGS. 1-7, the corresponding text, and the examples, provide a number of different systems and devices for authenticating user access to content based on an augmented token. In addition to the foregoing, embodiments can be described in terms of flowcharts comprising acts and steps in a method for accomplishing a particular result. For example, FIGS. 8 and 9 illustrate flowcharts of exemplary methods in accordance with one or more embodiments.

Figure 8:
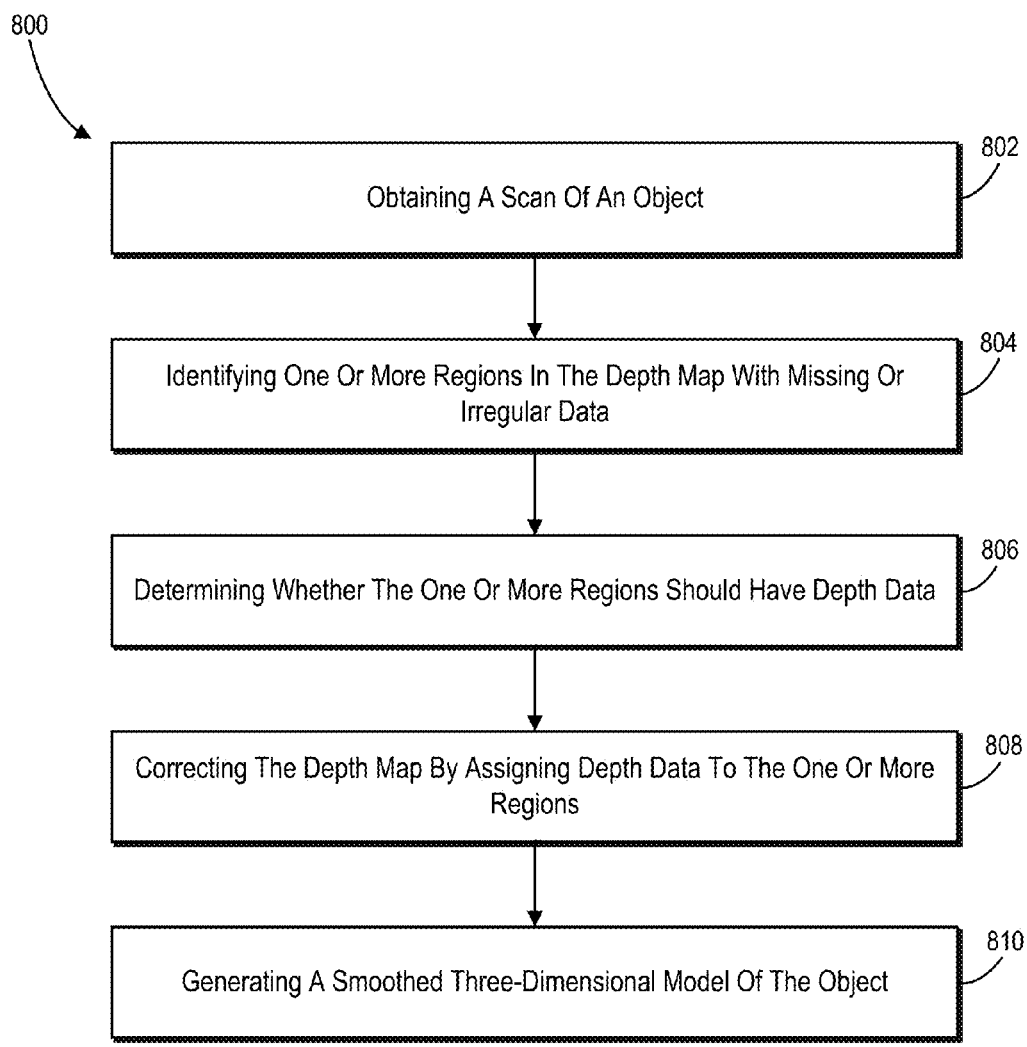
FIG. 8 illustrates a flowchart of a series of acts in a method of correcting depth errors in a three-dimensional scanned image in accordance with one or more embodiments.
Figure 9:
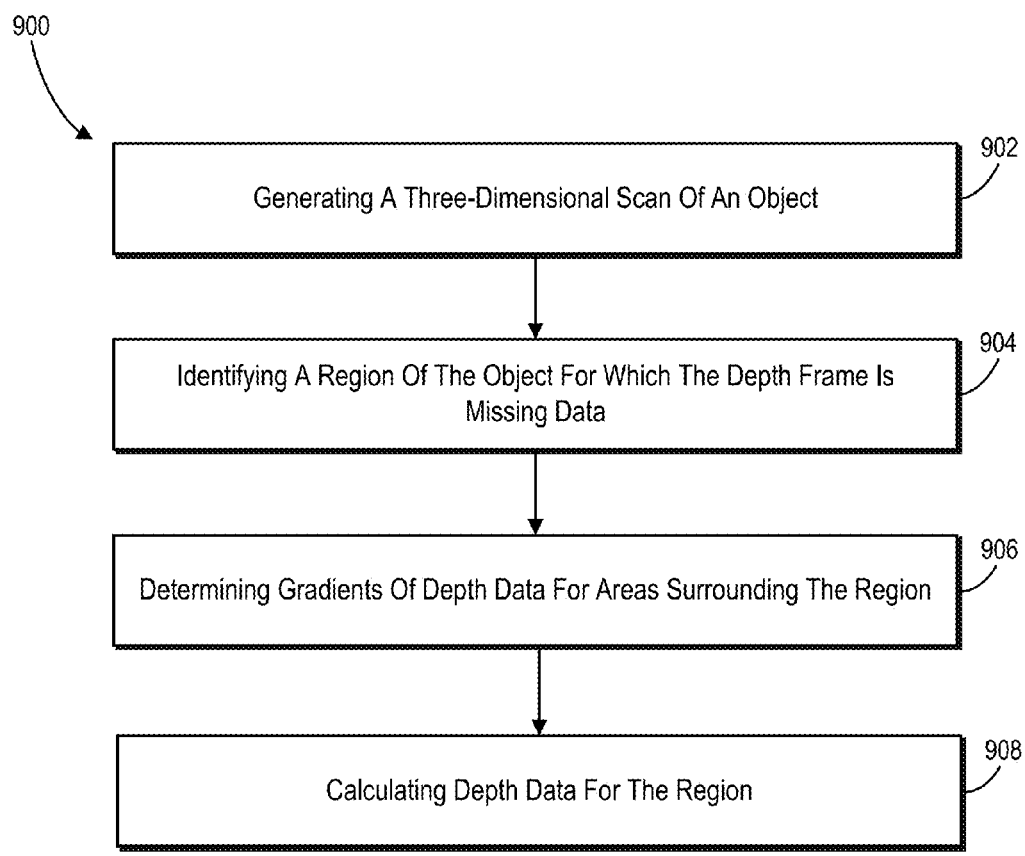
FIG. 9 illustrates a flowchart of a series of acts in another method of correcting depth errors in a three-dimensional scanned image in accordance with one or more embodiments.

FIG. 8 illustrates a flowchart of a method 800 of correcting depth errors in a three-dimensional scanned image. The method 800 includes an act 802 of obtaining a scan of an object 102. For example, act 802 involves obtaining a scan of an object with a depth frame for the object 102 and a color frame 300, 714 for the object 102. To illustrate, act 802 can involve obtaining a depth frame for the scene using a depth scanner. Additionally, act 802 can involve obtaining a color frame 300, 714 for the scene using a color scanner.

The method 800 also includes an act 804 of identifying one or more regions in the depth frame with missing or irregular data. For example, act 804 can involve generating a binary mask 400, 716 from the depth frame that indicates one or more regions of the scan that have regular depth information and the one or more regions that lack regular depth information. Additionally, act 804 can involve identifying portions of the binary mask 400, 716 with depth data marked as zero, and identifying connected portions of the binary mask 400, 716 with depth data marked as zero.

For example, act 804 can involve identifying one or more regions have missing or irregular data based on an amount of noise in the one or more regions in the depth frame. For instance, act 804 can also involve identifying one or more groups of connected pixels that have no depth data. To illustrate, act 804 can involve determining whether a noise level for the one or more regions exceeds a noise threshold. Alternatively, act 804 can involve determining whether a signal-to-noise ratio for the one or more regions is below a threshold.

As part of act 804, or as an additional act, the method 800 can include detecting an outer boundary of the object by identifying a threshold difference in depth values between a background of the scan and the outer boundary of the object. Additionally, the method 800 can include classifying any regions in the depth frame with missing or irregular depth data that are outside of the outer boundary of the object 102 as not being a region that should have depth data.

The method 800 further includes an act 806 of determining whether the one or more regions should have depth data. For example, act 806 involves determining whether the one or more regions in the depth frame with missing or irregular depth data should have depth data using the color data from the color frame 300, 714. To illustrate, act 806 can involve detecting an outer boundary of the object 102 based on depth data from the depth frame. Act 808 can also involve determining that a region from the one or more regions is within the outer boundary of the object based on a position of the region from the one or more regions relative to the outer boundary.

As part of act 806, or as an additional act, the method 800 can include performing edge detection on the color frame 300, 714 of the scan to identify edges in the color frame 300, 714, and comparing the identified edges to a region with missing or irregular depth data that is inside the outer boundary of the object to determine if one or more edges of the identified edges run parallel to a boundary of the region with missing or irregular depth data that is inside the outer boundary of the object 102. For example, if no edges run parallel to the boundary of the region with missing or irregular depth data, classifying the region with missing or irregular depth data as being the a region that should have depth data. Alternatively, if edges run parallel to the boundary of the region with missing or irregular depth data, classifying the region with missing or irregular depth data as not being a region that should have depth data. Additionally, the method 800 can include performing edge detection on the color frame 300, 714 of the scan to identify edges in the color frame by applying an edge detection algorithm to the color frame 300, 714. To illustrate, the edge detection algorithm can include a Sobel filter.

Additionally, the method 800 includes an act 808 of correcting the depth frame by assigning depth data to the one or more regions. For example, act 808 involves correcting the depth frame by assigning depth data to the one or more regions that should have depth data based on depth data from an area surrounding the one or more regions that should have depth data. To illustrate, act 808 can involve determining gradients of the area surrounding the one or more regions that should have depth data, and applying a surface-fitting algorithm using the determined gradients to calculate the depth data to assign to the one or more regions that should have depth data. For example, act 808 can involve applying a marching cubes algorithm or a marching tetrahedra algorithm to the identified region based on the determined gradient of the area surrounding the identified region.

Act 808 can also involve determining gradients of the area surrounding the one or more regions that should have depth data by calculating for each point (x,y,z) inside a first region that should have depth data, at a distance e from a boundary of the first region that should have depth data:

$$\frac{\partial f}{\partial x} = \frac{f(x+\epsilon) - f(x-\epsilon)}{2\epsilon}$$

$$\frac{\partial f}{\partial y} = \frac{f(y+\epsilon) - f(y-\epsilon)}{2\epsilon}$$

$$\frac{\partial f}{\partial z} = \frac{f(z+\epsilon) - f(z-\epsilon)}{2\epsilon}.$$

The method 800 also includes an act 810 of generating a smoothed three-dimensional model of the object 102. For example, act 810 involves generating a smoothed three-dimensional model of the object 102 by combining the corrected depth frame and the color frame 300, 714. To illustrate, act 810 can involve generating the smoothed three-dimensional model of the object 102 using smoothening surfaces corresponding to the one or more regions of the depth frame.

FIG. 9 illustrates a flowchart of another method 900 of correcting depth errors in a three-dimensional scanned image. The method 900 includes an act 902 of generating a three-dimensional scan of an object 102. For example, act 902 involves generating a three-dimensional scan of an object 102, the scan comprising a depth frame of the object 102 and a color frame 300, 714 of the object 102.

The method 900 also includes an act 904 of identifying a region of the object 102 for which the depth frame 400, 716 is missing depth data. For example, act 904 involves identifying, based on color data from the color frame 300, 714, a region of the object for which the depth frame is missing depth data. To illustrate, act 904 can involve identifying that the region missing depth data is an error created during generation of the three-dimensional scan of the object 102.

For example, act 904 can involve detecting an outer boundary of the object 102 by identifying a difference in depth values in the depth frame between a background of the three-dimensional scan and the object, identifying that the region missing depth data is within the outer boundary of the object 102, identifying edges in the color frame 300, 714, and determining that the identified edges do not correspond to a boundary of the region missing depth data. Additionally, act 904 can involve determining that the identified edges do not correspond to the boundary of the region missing depth data by determining that no edges run parallel to the boundary of the region. Act 904 can also involve generating a binary mask 400, 716 of the depth frame for identifying the region of the object for which the depth frame is missing depth data.

Additionally, the method 900 includes an act 906 of determining gradients of depth data for areas surrounding the region. For example, act 906 involves determining gradients of first depth data of one or more areas surrounding the region missing depth data. To illustrate, act 906 can involve determining gradients of first depth data from the depth frame for one or more areas adjacent the boundary of the region.

The method 900 also includes an act 908 of calculating depth data for the region. For example, act 908 involves calculating second depth data for the region missing depth data using the determined gradients of the first depth data. Act 908 can involve calculating second depth data for the region missing depth data using the determined gradients of the first depth data by applying a surface-fitting algorithm using the determined gradients of the first depth data to generate the second depth data.

The method 900 can also include an act of generating a smoothed three-dimensional mesh of the object 102 by combining the corrected depth frame and the color frame 300, 714. For example, generating the smoothed three-dimensional mesh of the object 102 can involve combining the calculated second depth of the region with color data for the region.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
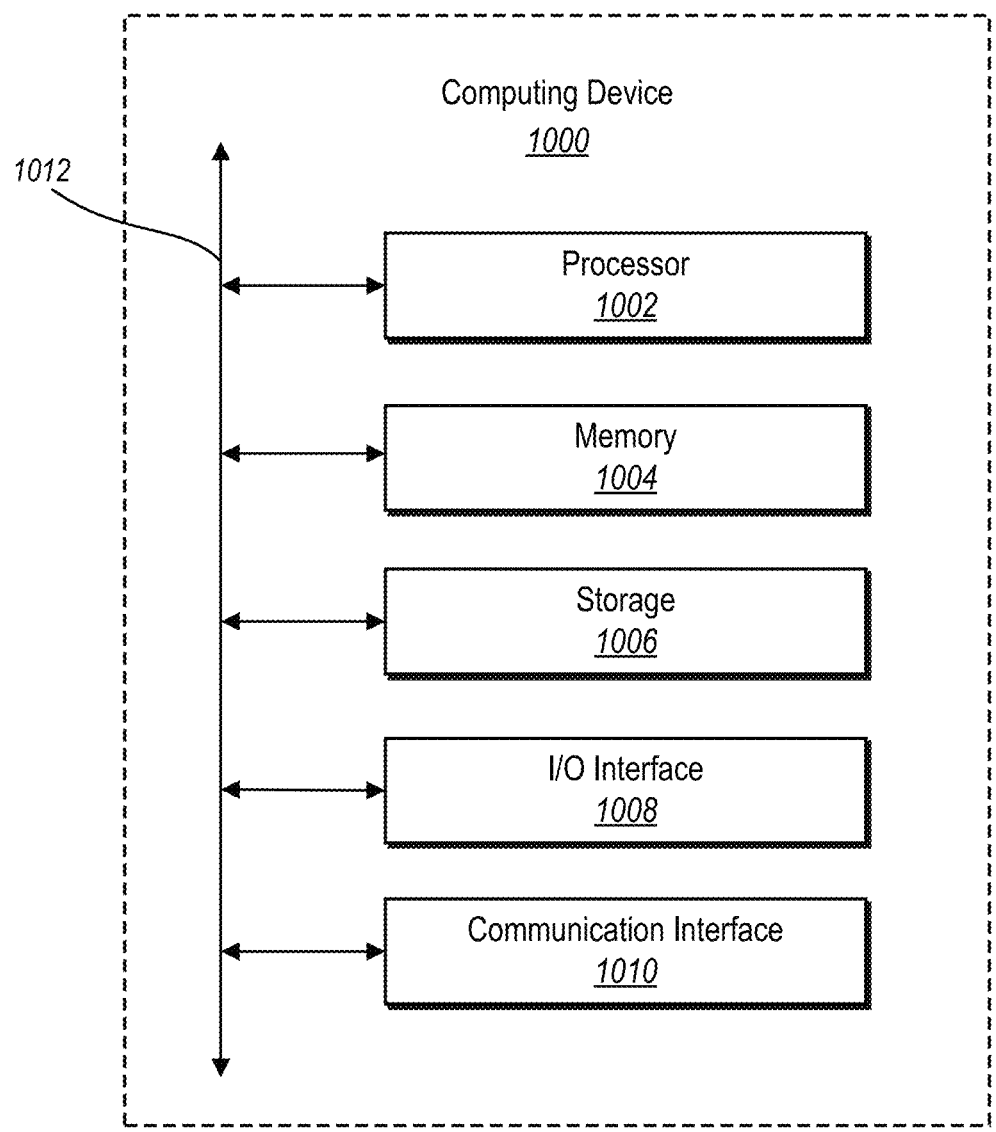
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the imaging system 100, 700. As shown by FIG. 10, the computing device 1000 can comprise a processor 1002, a memory 1004, a storage device 1006, an I/O interface 1008, and a communication interface 1010, which may be communicatively coupled by way of a communication infrastructure 712. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example and not by way of limitation, the processor 1002 may include one or more instruction caches, one or more data caches, and one or more translation lookaside buffers (TLBs). Instructions in the instruction caches may be copies of instructions in the memory 1004 or the storage 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 1000 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present disclosure is, therefore, indicated by the appended claims rather than by the foregoing description. All changes that come within the meaning and range of equivalency of the claims are to be embraced within their scope.

What is claimed is:

1. A method of correcting depth errors in a three-dimensional scanned image, comprising:
   obtaining, by at least one processor, a scan of an object with a depth frame and a color frame for the object;
   identifying, by the at least one processor, one or more regions in the depth frame with missing or irregular depth data by generating a binary mask from the depth frame that indicates one or more regions of the scan that have regular depth information and the one or more regions that lack regular depth information;
   determining, by the at least one processor, whether the one or more regions in the depth frame with missing or irregular depth data should have depth data by comparing the binary mask to color data from the color frame;
   correcting, by the at least one processor, the depth frame by assigning depth data to the one or more regions that should have depth data based on depth data from an area surrounding the one or more regions that should have depth data; and
   generating, by the at least one processor, a smoothed three-dimensional model of the object by combining the corrected depth frame and the color frame.

2. The method as recited in claim 1, wherein correcting the depth frame by assigning depth data to the one or more regions that should have depth data comprises:
   determining gradients of the area surrounding the one or more regions that should have depth data; and
   applying a surface-fitting algorithm using the determined gradients to calculate the depth data to assign to the one or more regions that should have depth data.

3. The method as recited in claim 2, wherein determining gradients of the area surrounding the one or more regions that should have depth data comprises:
   calculating for each point (x, y, z) inside a first region that should have depth data, at a distance e from a boundary of the first region that should have depth data:

$$\frac{\partial f}{\partial x} = \frac{f(x+\epsilon) - f(x-\epsilon)}{2\epsilon}$$
$$\frac{\partial f}{\partial y} = \frac{f(y+\epsilon) - f(y-\epsilon)}{2\epsilon}$$
$$\frac{\partial f}{\partial z} = \frac{f(z+\epsilon) - f(z-\epsilon)}{2\epsilon}.$$

4. The method as recited in claim 2, wherein:
   determining the gradients of the area surrounding the one or more regions that should have depth data comprises determining a rate of change of depth of a plurality of pixels in the area surrounding the one or more regions; and
   correcting the depth frame by assigning depth data to the one or more regions that should have depth data comprises assigning depth data that corresponds to the rate of change of depth of the plurality of pixels in the area surrounding the one or more regions.

5. The method as recited in claim 1, wherein identifying one or more regions in the depth frame with missing or irregular depth data comprises:
   identifying portions of the binary mask with depth data marked as zero;
   identifying connected portions of the binary mask with depth data marked as zero.

6. The method as recited in claim 1, further comprising:
   detecting an outer boundary of the object by identifying a threshold difference in depth values between a background of the scan and the outer boundary of the object; and
   classifying any regions in the depth frame with missing or irregular depth data that are outside of the outer boundary of the object as not being a region that should have depth data.

7. The method as recited in claim 6, further comprising:
   performing edge detection on the color frame of the scan to identify edges in the color frame;
   comparing the identified edges to a region with missing or irregular depth data that is inside the outer boundary of the object to determine if one or more edges of the identified edges run parallel to a boundary of the region with missing or irregular depth data that is inside the outer boundary of the object; and
   if no edges run parallel to the boundary of the region with missing or irregular depth data, classifying the region with missing or irregular depth data as being the a region that should have depth data;
   if edges run parallel to the boundary of the region with missing or irregular depth data, classifying the region with missing or irregular depth data as not being a region that should have depth data.

8. The method as recited in claim 7, wherein performing edge detection on the color frame of the scan to identify edges in the color frame comprises applying an edge detection algorithm to the color frame.

9. The method as recited in claim 1, further comprising identifying depth data for the area surrounding the one or more regions that should have depth data by:
   identifying a plurality of pixels in the area surrounding the one or more regions; and
   determining a plurality of depth values corresponding to the plurality of pixels from the depth frame.

10. A method of correcting depth errors in a three-dimensional scanned image, comprising:
   generating, by at least one processor, a three-dimensional scan of an object, the scan comprising a depth frame of the object and a color frame of the object;
   identifying, by the at least one processor and based on edge information of color data from the color frame, a region inside an outer boundary of the object for which the depth frame is missing depth data;
   determining gradients of first depth data of one or more areas surrounding the region missing depth data, the gradients comprising rates of change of depth data corresponding to pixels in the one or more areas surrounding the region missing depth data within the outer boundary of the object;
   calculating, by the at least one processor, second depth data for the region missing depth data using the determined gradients of the first depth data; and
   modifying depth data corresponding to the region missing depth data by assigning the second depth data to the region missing depth data.

11. The method as recited in claim 10, wherein calculating second depth data for the region missing depth data using the determined gradients of the first depth data comprises applying a surface-fitting algorithm using the determined gradients of the first depth data to generate the second depth data.

12. The method as recited in claim 10, further comprising identifying that the region missing depth data is an error created during generation of the three-dimensional scan of the object.

13. The method as recited in claim 12, wherein identifying that the region missing depth data is an error created during generation of the three-dimensional scan of the object comprises:
   detecting the outer boundary of the object by identifying a difference in depth values in the depth frame between a background of the three-dimensional scan and the object;
   identifying that the region missing depth data is within the outer boundary of the object;
   identifying edges in the color frame; and
   determining that the identified edges do not correspond to a boundary of the region missing depth data.

14. The method as recited in claim 13, wherein determining that the identified edges do not correspond to the boundary of the region missing depth data comprises determining that no edges in the color frame run parallel to the boundary of the region.

15. A system for correcting depth errors in a three-dimensional scanned image, comprising:
   at least one processor; and
   at least one non-transitory computer-readable storage medium storing instructions thereon that, when executed by the at least one processor, cause the system to:
   capture a scan of an object to obtain a depth frame for the object and a color frame for the object;
   identify one or more regions in the depth frame with missing or irregular depth data by generating a binary mask from the depth frame that indicates one or more regions of the scan that have regular depth information and the one or more regions that lack regular depth information;
   determine whether the one or more regions in the depth frame with missing or irregular depth data should have depth data by comparing the binary mask to color data from the color frame;
   correct the depth frame by assigning depth data to the one or more regions that should have depth data based on depth data from an area surrounding the one or more regions that should have depth data; and
   generate a smoothed three-dimensional model of the object by combining the corrected depth frame and the color frame.

16. The system as recited in claim 15, further comprising instructions that, when executed by the at least one processor, cause the system to correct the depth frame by assigning depth data to the one or more regions that should have depth data by:
   determining gradients of the area surrounding the one or more regions that should have depth data; and
   applying a surface-fitting algorithm using the determined gradients to calculate the depth data to assign to the one or more regions that should have depth data.

17. The system as recited in claim 16, wherein the instructions, when executed by the at least one processor, cause the system to determine gradients of the area surrounding the one or more regions that should have depth data by:
   calculating for each point (x,y,z) inside a first region that should have depth data, at a distance e from a boundary of the first region that should have depth data:

$$\frac{\partial f}{\partial x} = \frac{f(x+\epsilon) - f(x-\epsilon)}{2\epsilon}$$

$$\frac{\partial f}{\partial y} = \frac{f(y+\epsilon) - f(y-\epsilon)}{2\epsilon}$$

$$\frac{\partial f}{\partial z} = \frac{f(z+\epsilon) - f(z-\epsilon)}{2\epsilon}.$$

18. The system as recited in claim 15, further comprising instructions that, when executed by the at least one processor, cause the system to detect that a region from the one or more regions is located within the object by:
   detecting an outer boundary of the object based on depth data from the depth frame; and
   determining that the region is within the outer boundary of the object based on a position of the region relative to the outer boundary.

19. The system as recited in claim 18, further comprising instructions that, when executed by the at least one processor, cause the system to:
   identify portions of the binary mask with depth data marked as zero;
   identify connected portions of the binary mask with depth data marked as zero.

20. The system as recited in claim 19, further comprising instructions that, when executed by the at least one processor, cause the system to:
   perform edge detection on the color frame of the scan to identify edges in the color frame;

compare the identified edges to a region with missing or irregular depth data that is inside the outer boundary of the object to determine if one or more edges of the identified edges run parallel to a boundary of the region with missing or irregular depth data that is inside the outer boundary of the object; and if no edges run parallel to the boundary of the region with missing or irregular depth data, classify the region with missing or irregular depth data as being the a region that should have depth data;

if edges run parallel to the boundary of the region with missing or irregular depth data, classify the region with missing or irregular depth data as not being a region that should have depth data.

* * * * *